UNITED STATES PATENT OFFICE.

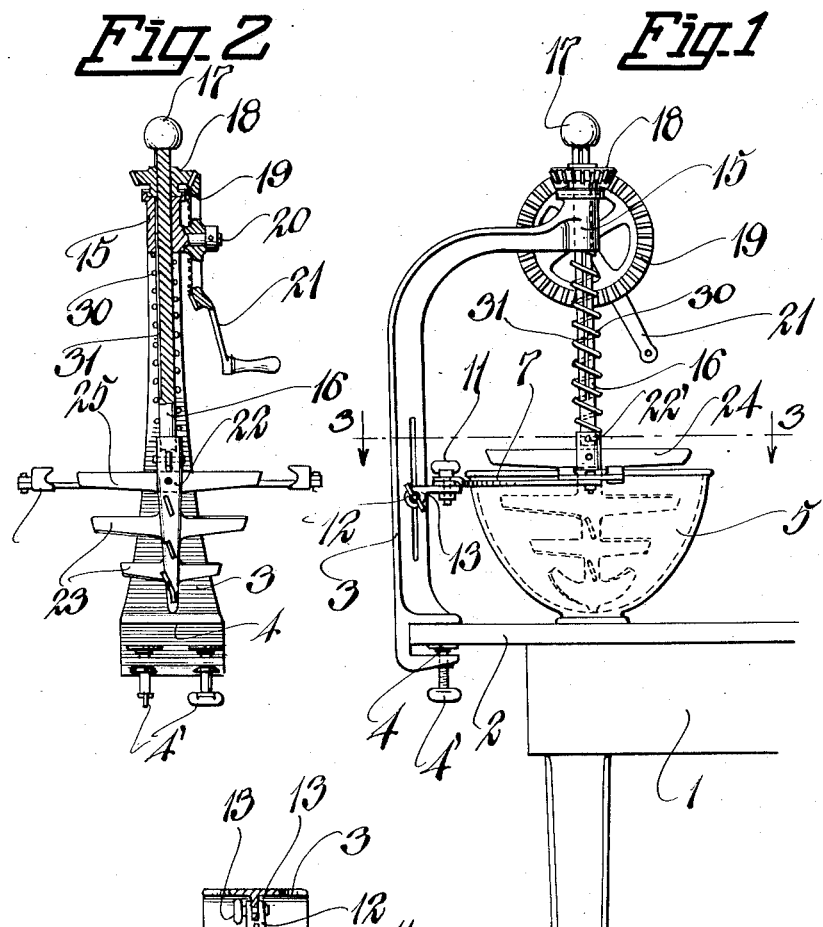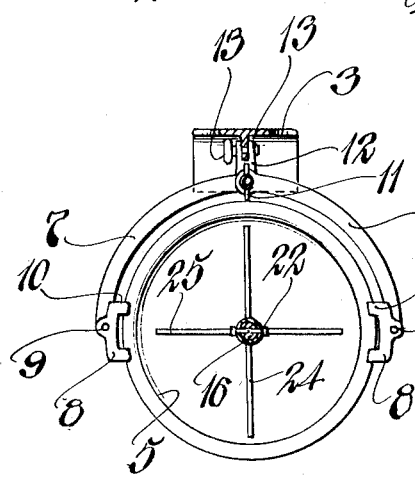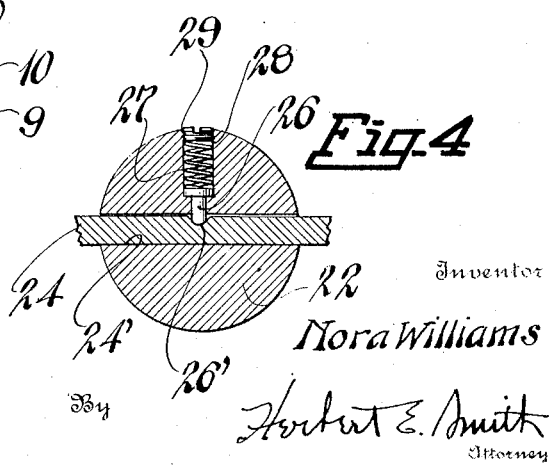

NORA WILLIAMS, OF SPOKANE, WASHINGTON.

MIXER.

1,391,439.  Specification of Letters Patent.  Patented Sept. 20, 1921.

Application filed August 23, 1920. Serial No. 405,377.

*To all whom it may concern:*

Be it known that I, NORA WILLIAMS, a citizen of the United States, residing at Spokane, in Spokane county, and State of Washington, have invented certain new and useful Improvements in Mixers, of which the following is a specification.

My present invention relates to improvements in mixers of the hand operated, rotary dasher type, especially adapted for mixing bread, cakes, and egg batters, whipping cream, &c., and generally adapted for similar general use as a kitchen utensil.

The primary object of the invention is the provision of a device of this character that is simple in construction and operation, composed of comparatively few parts, and capable of facile and efficient operation. The invention consists in certain novel combinations and arrangements of parts whereby the mixing tool or dasher may be depressed into or elevated from the pan or other vessel containing the mixture, without disturbing or altering the position of the operating mechanism for the dasher. The invention also contemplates the use of resilient means for holding the rotary dasher or mixing device in proper operative position with relation to the mixture, and other meritorious features are combined and arranged, as hereinafter pointed out, for providing a durable, compactly arranged, and conveniently operated device of this character.

In the accompanying drawings I have illustrated one complete example of the physical embodiment of my invention in which the parts are combined and arranged according to the best mode I have so far devised for the practical application of the principles of my invention.

Figure 1 is a view in side elevation showing the device complete, and clamped to a table top in position for use.

Fig. 2 is a vertical sectional view showing the operating parts of the device in detail, the bowl or container being omitted, and the parts as seen from the right in Fig. 1.

Fig. 3 is a horizontal sectional view at line 3—3 of Fig. 1.

Fig. 4 is an enlarged detail sectional view showing the connection of one of the removable dasher blades to the spindle shank.

In order that a clear understanding of the invention may be secured I have illustrated a portion of a table 1 to the top 2 of which the upright post or standard 3 of the mixing device is clamped. The standard is of metal and of proper dimensions and fashioned with spaced clamping jaws 4 at its lower end with which the clamping screws 4' co-act to rigidly secure the device to the table top in usual manner.

The device is utilized in connection with a bowl or container 5, which is supported on the table and held in rigid relation to the operating parts of the mixer by a pair of supporting arms 6 and 7. These arms are of metal, and curved as shown in Fig. 3, to conform to the periphery of the bowl or vessel 5, and at the ends of the arms are carried attaching heads 8, pivoted at 9 to permit the heads to adjust themselves to the rim of the bowl, there being provided clamp fingers 10 on each of the heads to engage the rim of the bowl.

These arms project horizontally from the standard and are adapted for use with various sizes of bowls, within limits, and may be adjusted for this purpose through the instrumentality of the set screw 11 and the bracket 12, the former providing means for clamping the two converging ends of the arms to the latter to form a rigid support for the bowl.

The bracket 12 is vertically adjustable on the standard in order that the arms may be elevated or depressed to adapt them to different heights of bowls, and to secure this vertical adjustment I employ a screw or bolt 13 which is passed through the forked head 13' of the bracket, and also through the vertically extending slot 14 of the standard. Thus, by loosening the screw or bolt 13, the bracket, guided by its forked head, may be elevated or depressed, the bolt siding in the slot 14, to desired position and then the forked head is clamped to the standard by turning tight the screw 13 in the head and standard.

At its upper end the standard is bent over horizontally, and provided with an end, vertically extending bearing head 15 for the vertically disposed spindle 16, which latter has a head or knob 17 at its upper end for use in elevating or depressing the spindle. The spindle is revolved through the medium of a beveled pinion 18 and a beveled gear 19, the former revoluble with the spindle, and the latter journaled on a bearing pin 20 integral with the head and provided with a hand crank or handle 21 by means of which the gear, pinion and spindle are revolved.

The rotary dasher carried by the spindle involves a shank 22 secured on the lower end of the spindle by means of a transverse pin 22′ passed through the upper socketed end of the shank, and the lower end of the spindle fitted therein, as shown. The blades or paddles 23 of the dasher are integral therewith and project radially from the shank as shown, varying in length, and generally conforming and adapting them for use in the interior of the bowl or other vessel 5, as indicated in dotted lines Fig. 1 and full lines Fig. 2.

At the upper end of the shank are additional blades 24 and 25, each in a single piece, and detachably secured in transverse openings 24′ of the shank, disposed on diametrical lines, and these blades or paddles may be removed when not needed, as when the device is being used in a smaller bowl than that indicated in the drawings, or when the device is used for light work. These removable blades are retained in the shank by means of spring pressed studs 26 which engage seats or recesses 26′ of the blades and are pressed into engagement by the springs 27 located in the sockets 28 of the shank, the latter sockets being closed by a screw plug 29, as usual.

By means of a spring 30, coiled about the spindle, and located between the fixed head 15 and the shank of the spindle, the dasher is held in operative position as in Fig. 1, but the spindle and dasher may be bodily lifted or elevated from the bowl, to enable removal of the latter when required, by grasping the knob 17 and lifting the spindle and dasher. The spindle is provided with a key or groove 31 in its periphery extending along its axis, and the pinion 18 is fashioned with a key or feather 32 engaged in the key way to permit sliding movement of the spindle in the pinion and head, and also lock the pinion and spindle at all times for joint rotary movement. The pinion is rotatably held at the top of the head by a retaining ring or cap 33, secured on the head and engaging a portion of the pinion to retain it in place.

From the above description taken in connection with my drawings it is apparent that the dasher or mixing blades are held in place by the expansible spring between the head and shank, in order that the proper mixing or agitating action may be produced, and when it is desired to remove the bowl, by grasping the knob 17, the spindle and dasher may be bodily lifted, guided in the head and pinion, sufficiently to permit removal of the bowl. The pinion and gear remain at all times in mesh and are ready for operation, and the dasher is automatically adjustable, through the action of the spring, to engage the bottom of the bowl and be in porper position for use in the bowl.

What I claim is—

The combination with a rotatable spindle and its shank having fixed dasher blades, of removable blades engaged in sockets in said shank and provided with notches, studs in said shank engaging said notches, springs for said studs, and screw plugs for retaining said springs in sockets in the shank.

In testimony whereof I affix my signature.

Mrs. NORA WILLIAMS.